Patented Apr. 24, 1923.

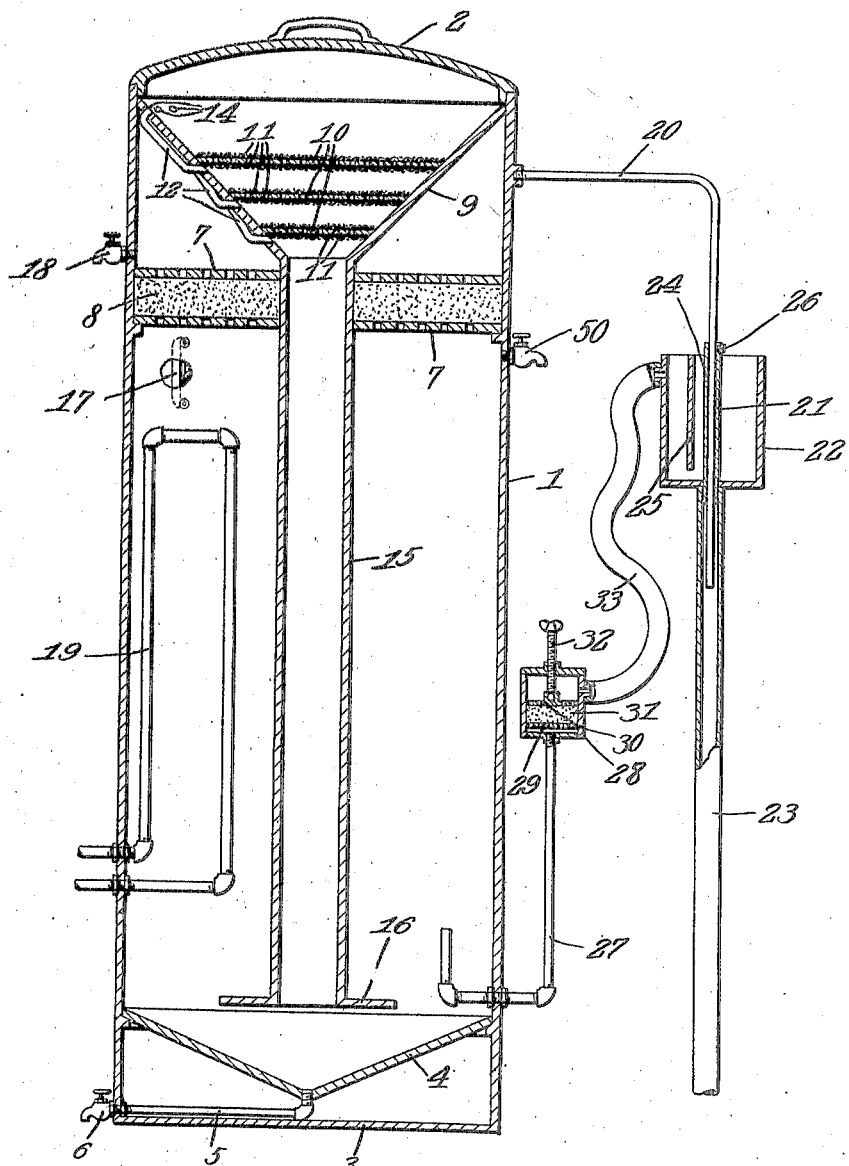

1,453,169

UNITED STATES PATENT OFFICE.

JOHN HUNSICKER PACKER, OF LIBERTY, MISSOURI.

FILTERING TANK.

Application filed August 19, 1921. Serial No. 493,538.

*To all whom it may concern:*

Be it known that I, JOHN H. PACKER, a citizen of the United States, residing at Liberty, in the county of Clay and State of Missouri, have invented a new and useful Filtering Tank, of which the following is a specification.

This invention aims to provide a simple means whereby oil may be filtered, by passing the oil through water, novel improvements being provided for letting the air out of certain parts of the device, for securing a proper flow of the oil and water, and for other purposes, which will be made manifest hereinafter.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

A single sectional figure discloses a filter constructed in accordance with the invention, parts being left in elevation.

The device forming the subject matter of this application comprises a cylindrical casing 1 which may be surmounted by a removable lid 2, the casing 1 having a base 3 and a funnel-shaped bottom 4. A pipe 5 leads from the lowermost portion of the bottom 4 through the side wall of the casing 1 and terminates in a cock 6. The parts 5 and 6 constitute means whereby the sediment may be drawn away. Plates 7 are located in the casing 1 adjacent to the upper end thereof and are held in position in any desired way. The plates are perforated, filtering material 8 being located between the plates. An air cock 50 is located below the lowermost plate 7 and is carried by the casing 1.

A receiver or funnel 9 is located in the upper portion of the casing 1. Plates 10 extend across the interior of the funnel 9, the plates carrying textile material 11, and being perforated. The plates and the textile form screens located in the funnel 9. From beneath each screen, an air conduit 12 leads, the air conduits opening, as indicated at 14, into the funnel 9 adjacent to the top thereof, and above the uppermost screen. The conduits 12 constitute means for letting out the air from beneath the screens.

The funnel 9 carries a depending neck 15 extended downwardly through the plates 7 and through the filtering material, to the point adjacent to the bottom 4. On the lower end of the neck 15 there is an outstanding baffle 16. At a point below the filtering mechanism 7—8, the casing 1 is provided with a gage 17. The casing 1 carries an outlet, which may be a faucet 18, the faucet being located above the filtering mechanism 7—8 and communicating with the space between the filtering mechanism and the funnel 9. A heating pipe 19 may enter the casing 1, if desired.

An angular arm 20 extends downwardly from the casing 1 on the exterior thereof. A tube 21 is slidable for adjustment on the vertical portion of the arm 20, the tube carrying a cup or water holder 22. The cup 22 is connected with a pipe 23, the tube 21 discharging into the pipe. The tube 21 is supplied with an opening 24, through which liquid may pass from the cup 22 into the tube 21 and thence into the pipe 23. A baffle 25 extends across the cup 22 transversely, the baffle being spaced from the bottom of the cup. A set screw 26 is threaded into the tube 21 and, cooperating with the vertical portion of the arm 20 forms a means whereby the cup 22 may be held in adjusted vertical positions. The numeral 27 denotes a U-shaped pipe, one end of which enters the casing 1 adjacent to the bottom 4. The other end of the pipe 27 upstands on the outside of the casing 1 and carries a receptacle 28 in which is located a fixed lower plate 29. An upper plate 30 is slidable in the receptacle 28, filtering material 31 being located between the plates 29 and 30. A screw 32 is threaded into the top of the receptacle 28 and, cooperating with the plate 30 affords a means whereby the filtering material 31 may be compressed. A flexible tube 33 leads from the space above the plate 30 to the cup 22.

In practical operation, the casing 1 is filled with water to a point indicated on gage 17. Dirty oil is thrown into the funnel 9 and passes downwardly through the screens 10—11, the air beneath the screens being let out through the conduits 12. The oil flows downwardly through the water in neck 15 of the funnel 9 and rises through the water in the casing 1. The oil passes through the filtering material 8 and, in its clean condition, may be drawn away as desired, through the outlet 18.

Should it be desired to heat the contents of the casing 1, this operation may be brought about by passing steam or hot water through the pipe 19. The sediment collecting on the bottom 4 may be drawn away through the pipe 5 and the cock 6.

At times some water may enter the filter, along with the oil, by way of the funnel 9, thus tending to create too high a level of water in the casing 1. The water flows through the pipe 27, the receptacle 28, the tube 33, the cup 22, the tube 21 and the pipe 23. By compressing the filtering material 31 in the receptacle 28, more or less; by means of the screw 32, and by adjusting the vertical position of the cup 22, the water may be kept at any desired level in the casing 1. The function of the outstanding baffle 16 is to facilitate the distribution of the oil and to prevent the oil from working up the side of the tube 15, and to compel the oil to mix with the water, and so divide its particles that it can free itself from the small grains of dirt which are mixed with the oil.

The length of the tank 1 is much greater than its diameter, and the tank is filled three-fourths full of water. The tube 15 is of relatively small diameter, and the diameter of the tank 1 is approximately ten times that of the tube 15. As a result of the foregoing, the weight of the water overcomes the weight of the oil in the tube 15, and the water is forced to extend up some distance in the tube. This causes the oil to mix thoroughly with the water, which breaks up the oil into small particles, the oil being free from dirt.

Having thus described the invention, what is claimed is:

A device of the class described comprising a casing; a filter extended across the casing adjacent to the top of the casing; a funnel in the casing above the filter, the funnel having a neck connected directly to the funnel and extending downwardly through the filter to a point adjacent to the bottom of the casing; superposed upper and lower screens extended across the funnel; air inlet conduits external to the funnel, the upper ends of all of the conduits opening through the funnel above the upper screen, the lower end of one conduit opening through the funnel below the lower screen, and the lower end of another of the conduits opening through the funnel at a point between the screens; and an outlet for the casing, the outlet being located above the filter.

In testimony that I claim the foregoing as my own, I have hereto affixed my signature in the presence of two witnesses.

JOHN HUNSICKER PACKER.

Witnesses:
C. W. PETERS,
WM. F. PARADISE.